(12) United States Patent
Liu et al.

(10) Patent No.: US 10,618,829 B2
(45) Date of Patent: *Apr. 14, 2020

(54) SEWAGE TREATMENT DEVICE

(71) Applicant: Zhijun Wang, Shenzhen (CN)

(72) Inventors: Xiaojun Liu, Shenzhen (CN); Caixia Wang, Shenzhen (CN); Junlong Liu, Shenzhen (CN)

(73) Assignee: Zhijun Wang, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,084

(22) Filed: Jan. 9, 2019

(65) Prior Publication Data

US 2019/0248690 A1   Aug. 15, 2019

(30) Foreign Application Priority Data

Feb. 9, 2018   (CN) .......................... 2018 1 0132211

(51) Int. Cl.
*C02F 9/00* (2006.01)
*B01D 39/20* (2006.01)
(Continued)

(52) U.S. Cl.
CPC ................ *C02F 9/00* (2013.01); *B01D 39/16* (2013.01); *B01D 39/2068* (2013.01);
(Continued)

(58) Field of Classification Search
CPC ..... E03F 1/006; E03F 5/22; E03F 3/02; F04B 43/113; F04B 49/04; F04D 9/042;
(Continued)

(56) References Cited

U.S. PATENT DOCUMENTS 4,936,986 A * 6/1990 Tarves, Jr. ......... B01D 17/0217
                                                       210/321.64
4,937,005 A * 6/1990 Shelstad .............. B01D 29/213
                                                       210/785
(Continued)

FOREIGN PATENT DOCUMENTS

CN       201268644    *   7/2009    ................ C02F 9/12
CN       106517557    *   3/2017    ................ C02F 9/02
(Continued)

OTHER PUBLICATIONS

Pure Aqua, Clack Calcite Filtration Media Data Sheet, Dec. 9, 2016, p. 1 (Year: 2016).*
(Continued)

*Primary Examiner* — Nam X Nguyen
*Assistant Examiner* — Ekandra S. Miller-Cruz

(57) ABSTRACT

The present disclosure of a sewage treatment device includes a compression tank that is cylinderically shaped, a stirring structure communicated with the compression tank by a first intermediate pipe, and a detection box communicated with the stirring structure by a second intermediate pipe. A telescopic driving cylinder is arranged on an upper portion of the compression tank and a conveying pipe is connected to a top surface of the compression tank to deliver external sewage to an interior of the compression tank. A diameter of the conveying pipe ranges from 8-15 cm; A filter interlayer is arranged in an interior of the compression tank and the filter interlayer is annular. An end of a driving shaft of the telescopic drive cylinder is connected with a compression body. An outer periphery of the compression body is contacted with an inner wall of the filter interlayer.

5 Claims, 4 Drawing Sheets

(51) Int. Cl.
*B01D 39/16* (2006.01)
*C02F 1/00* (2006.01)
*C02F 1/28* (2006.01)
*C02F 1/42* (2006.01)
*C02F 1/32* (2006.01)
*C02F 1/46* (2006.01)
*C02F 1/78* (2006.01)

(52) U.S. Cl.
CPC .............. *C02F 1/004* (2013.01); *C02F 1/283* (2013.01); *C02F 1/325* (2013.01); *C02F 1/42* (2013.01); *C02F 1/46* (2013.01); *C02F 1/78* (2013.01); *C02F 2001/425* (2013.01); *C02F 2209/008* (2013.01); *C02F 2209/06* (2013.01); *C02F 2209/40* (2013.01); *C02F 2209/42* (2013.01); *C02F 2303/04* (2013.01)

(58) Field of Classification Search
CPC ... B65D 88/22; C02F 9/00; C02F 1/78; C02F 1/42; C02F 2001/425; C02F 2209/40; C02F 2303/04; C02F 1/325; C02F 2209/06; C02F 2209/42; C02F 1/283; C02F 1/004; C02F 2209/008; C02F 1/46; B01D 39/16; B01D 39/2068; B01D 24/00; B01D 24/042; B01D 24/045; B01D 24/105; B01D 24/12; B01D 24/18; B01D 24/205; B01D 29/0002; B01D 29/0095; B01D 29/60; B01D 29/601–608; B01D 29/682; B01D 29/82; B01D 29/824; B01D 2201/00
USPC ........ 210/386, 391, 395, 396, 112, 533–535, 210/323.1, 324, 331, 340; 137/386, 391, 137/393, 395, 396
See application file for complete search history.

(56) References Cited

U.S. PATENT DOCUMENTS

2011/0155564 A1* 6/2011 Oifman .............. B01D 21/0003
 204/230.2
2013/0168327 A1* 7/2013 Clark .................... G01N 21/77
 210/739

FOREIGN PATENT DOCUMENTS

CN 206434926 * 8/2017 ............. B01D 29/27
CN 107265733 * 10/2017 ................ C02F 9/10

OTHER PUBLICATIONS

Dale Babcock, Materials for Oleophobic and Hydrophobic Coatings, Jun. 23, 2012, p. 12 (Year: 2012).*
Neeva Aero Solutions, Blower & Grids Webpage, Aug. 14, 2017, pp. 1-2 (Year: 2017).*

* cited by examiner

SEWAGE TREATMENT DEVICE

BACKGROUND

1. Technical Field

The present disclosure relates to a field of sewage treatment device technology, and in particularly to a sewage treatment device with good sewage treatment effect, high safety and reliability, good environmental protection, energy saving, and low operation cost.

2. Description of Prior Art

Water is a source of life and a fundamental guarantee survival of all things. Water shortage and serious water pollution are subject themes of world's attention. In industrial and domestic sewage treatment, a conventional treatment process is to complete the whole process by discharging the sewage sequentially through a sedimentation tank, a horizontal flow pond, a filtering device, a concentration tank, a sludge and water separation device, and etc. The sewage sedimentation tank naturally precipitate the sewage in the sedimentation tank, so that sludge in the sewage is precipitated at the bottom of the sedimentation tank, thereby facilitating collection. However, such a device occupies a large area, and further, has a high cost, a large equipment investment, and a high operating cost. It is difficult for ordinary small and medium-sized enterprises to adopt this method for sewage treatment, which has great limitations. Therefore, it is necessary to carry out a new technical solution to overcome these problems.

With continuous improvements of a level of intelligence, how to cater to the current state of intelligence, combine the sewage treatment device with intelligence, and further improve a safety performance are frequently considered by those skilled in the art. A lot of research, development and experiments have been carried out and a good result has been obtained.

SUMMARY

In order to overcome the problems existing in the prior art, the present disclosure provides a sewage treatment device with good sewage treatment effect, high safety and reliability, good environmental protection, energy saving, and low operation cost.

Compared with the prior art, the present disclosure of a sewage treatment device with high safety and reliability comprises a compression tank that is cylinderically shaped, a stirring structure communicated with the compression tank by a first intermediate pipe and a detection box communicated with the stirring structure through a second intermediate pipe. A filter interlayer is arranged in an interior of the compression tank and the filter interlayer is annular. An end of a driving shaft of the telescopic drive cylinder is connected with a compression body. An outer periphery of the compression body is contacted with an inner wall of the filter interlayer. By extrusions and compression of the compressed body, the sewage is filtered by a plurality of filter plates, and the stirring structure is able to further purify the sewage to improve a treatment efficiency. The sewage treatment device is reasonable in system structure design, low in production cost, and good in use effect, and the sewage treatment device is suitable for a wide range of promotion.

DETAILED DESCRIPTION

To make the objects, technical proposals and merits of the present disclosure more apparent, the present disclosure will be further described in detail with reference to the drawings and embodiments. It should be understood that the embodiments described here are only used to illustrate the present disclosure and are not intended to limit the present disclosure.

Figure 1:
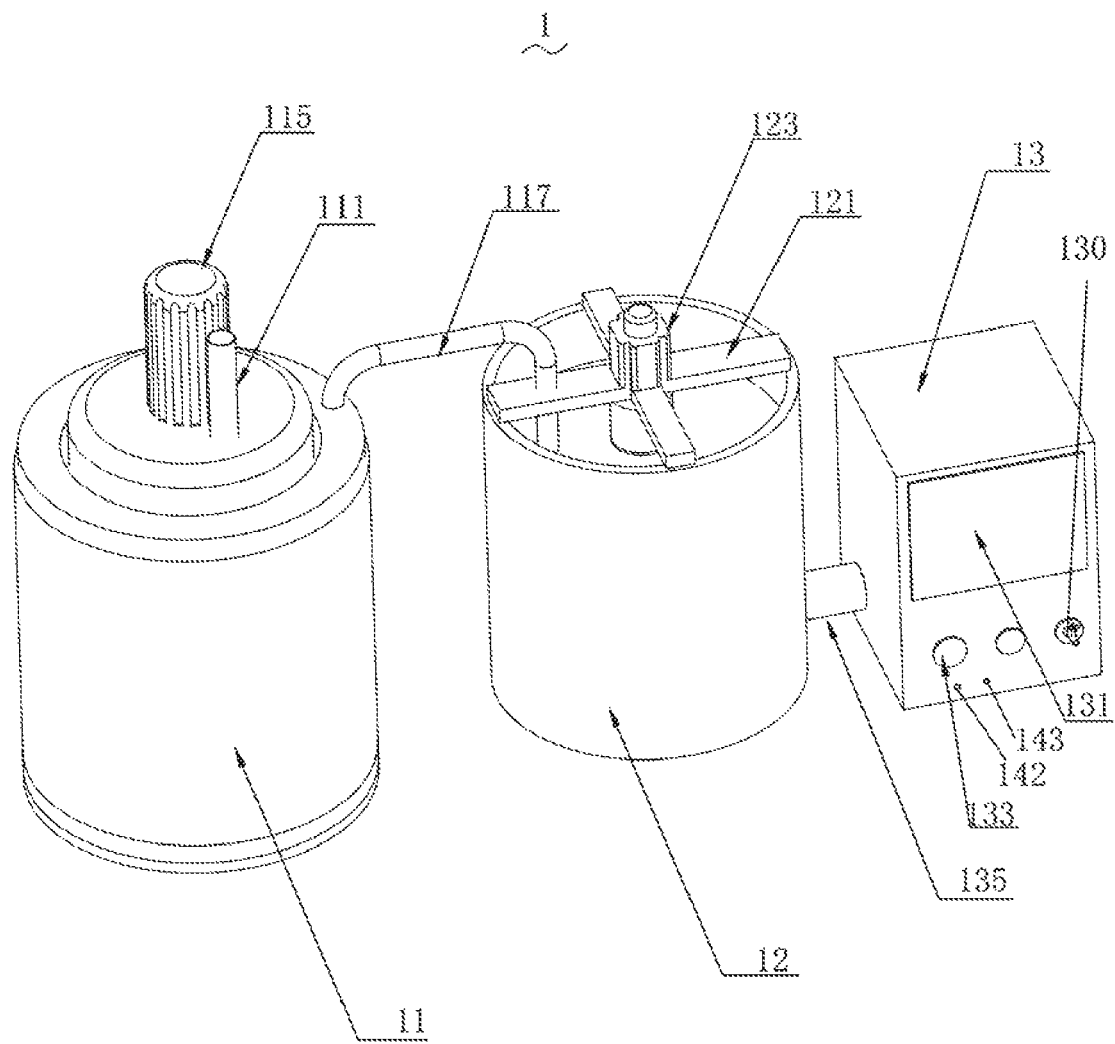
FIG. 1 is a perspective view showing a structure diagram of a sewage treatment device of the present disclosure.
Figure 2:
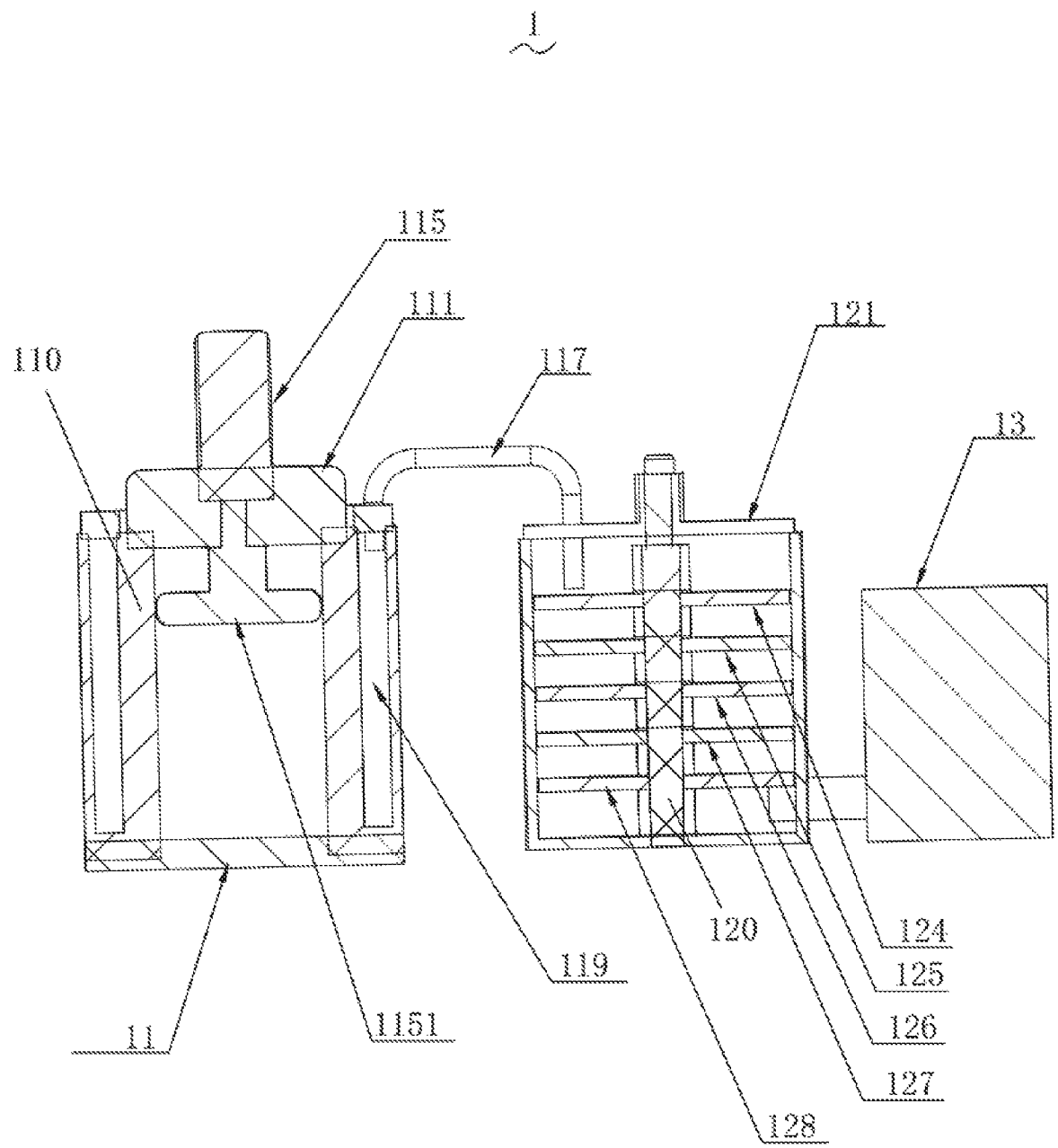
FIG. 2 is a cross-sectional view showing the structure diagram of the sewage treatment device of the present disclosure.
Figure 3:
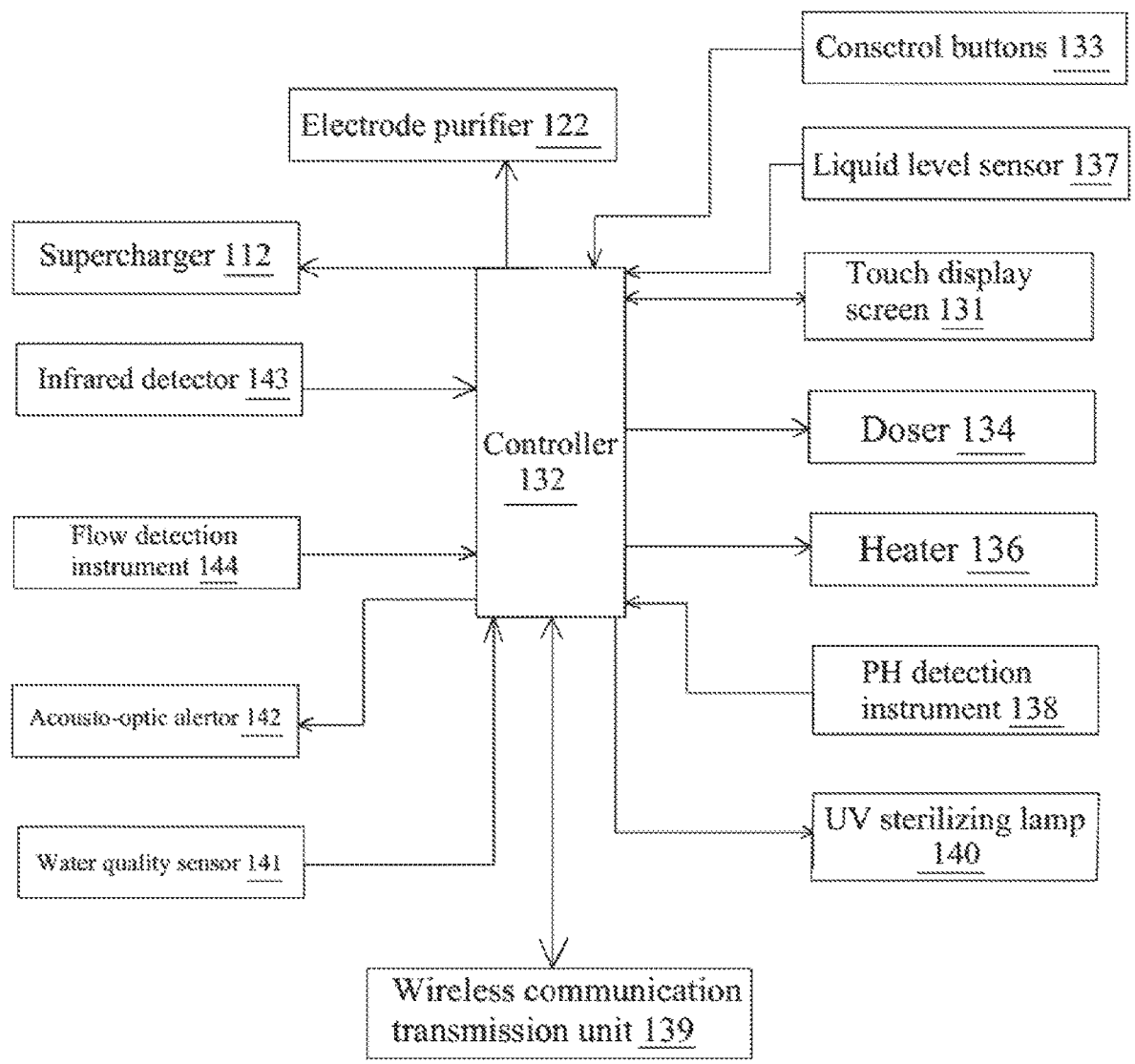
FIG. 3 is a schematic diagram showing a circuit connecting structure of the sewage treatment device of the present disclosure and FIG. 4 is a cross sectional view of a filter interlayer.
Figure 4:
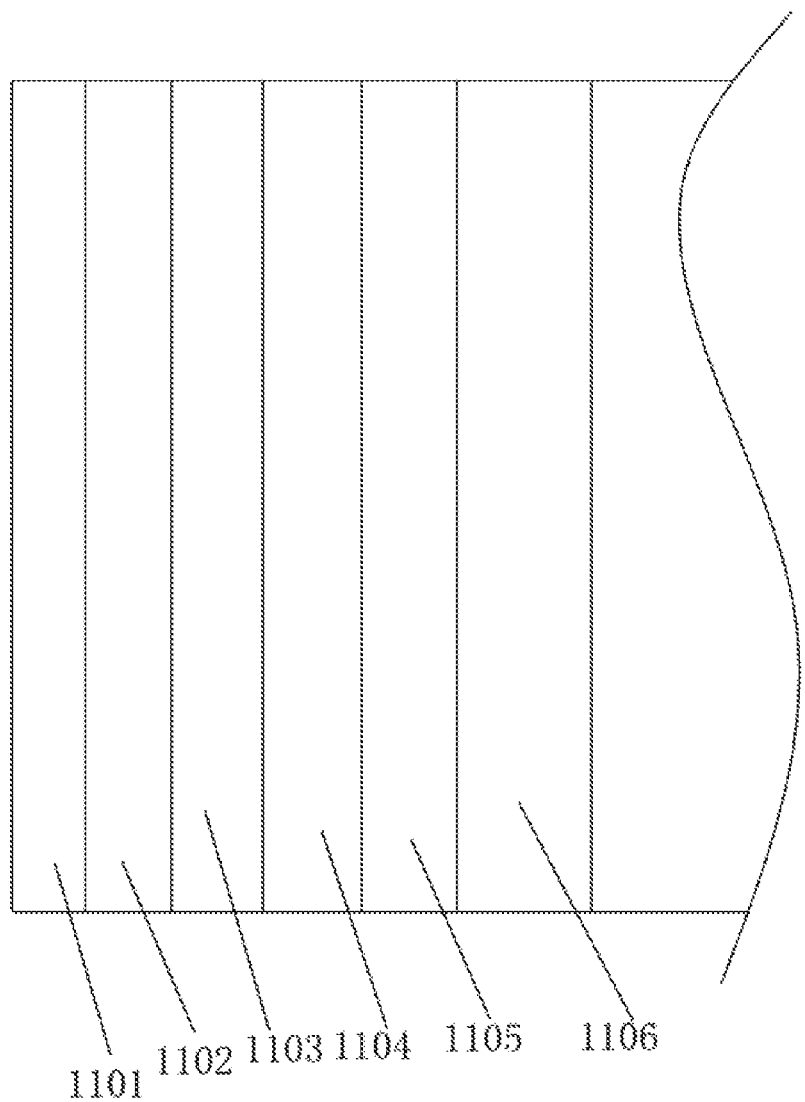

As shown in FIG. 1 to FIG. 4, the present disclosure of a sewage treatment device 1 comprises a compression tank 11 that is cylindrically shaped, a stirring structure 12 communicated with the compression tank 11 by a first intermediate pipe 117, and a detection box 13 communicated with the stifling structure 12 by a second intermediate pipe 135. A telescopic driving cylinder 115 is arranged on an upper portion of the compression tank 11. A conveying pipe 111 is connected with a top surface of the compression tank 11 to deliver external sewage to an interior of the compression tank 11. A diameter of the conveying pipe 111 ranges from 8-15 cm. A filter interlayer 110 is arranged in the interior of the compression tank 11 and the filter interlayer 110 is annular. An end of a driving shaft of the telescopic drive cylinder 115 is connected with a compression body 1151. An outer periphery of the compression body 1151 is contacted with an inner wall of the filter interlayer 110. The compressed body 1151 is made of silicone and has a thickness in a range of 7-12 cm. The filter interlayer 110 comprises a sponge filter layer 1106, an activated carbon filter layer 1105, and a polyvinyl chloride (PVC) filter layer 1104. The activated carbon filter layer 1105 is greater than the sponge filter layer 1106 and the PVC filter layer in thickness 1104. The activated carbon filter layer 1105 ranges from 3-5 cm in thickness. The sponge filter layer 1106, the activated carbon filter layer 1105, and the PVC filter layer 1104 defining a plurality of filter holes (e.g., openings embedded in the filter layers) where the filter holes are configured to filter sewage. The filter holes of the sponge filter layer, the filter holes of the activated carbon filter layer and the filter holes of the PVC filter layer are gradually reduced in aperture. Each of the filter holes of the sponge filter layer ranges from 0.3-0.6 mm in aperture. An end of the first intermediate pipe 117 extends into a portion 119 arranged between the interior portion of the compression tank 11 and the filter interlayer 110. Sewage compressed by the compression body 1151 is filtered by the filter interlayer 110 from the interior portion of the compression tank 11 to the portion 119 arranged between the interior portion of the compression tank 11 and the filter interlayer 110, and then transported to the stirring structure 12 by the first intermediate pipe 117. A rotating shaft 120 and a plurality of filter plates connected with the rotating shaft are arranged inside the stirring structure 12. A plurality of filter plates comprise a quartz sand filter plate 124, a cobble filter plate 125, an anthracite filter plate 126, an activated carbon filter plate 127 and a fiber filter plate 128. The quartz sand filter plate 124, the cobble filter plate 125, the anthracite filter plate 126, the activated carbon filter plate 127 and the fiber filter plate 128 are sequentially reduced in thickness. The quartz sand filter plate 124 ranges from 7.1-6.9 cm in thickness. The cobble filter plate 125 ranges from 5.8-6.7 cm in thickness. The anthracite filter plate 126 ranges from 4.9-5.5 cm in thickness. The activated carbon filter plate 127 ranges from 4.3-4.8 cm in thickness. The fiber filter plate 128 ranges from 3.3-4.2 cm in thickness.

The sewage treatment device 1 further comprises a driving motor 123 configured to drive the rotary shaft 120 to rotate. A cross support frame 121 is arranged on an upper portion of the stirring structure 12. The driving motor 123 is directly mounted on an upper portion of the cross support frame 121. A controller 132, a doser 134, a heater 136, a liquid level sensor 137, a PH detection instrument 138, a wireless communication transmission unit 139, an ultraviolet (UV) sterilizing lamp 140, and a water quality sensor 141 are arranged inside the detection box 13. The doser 134, the heater 136, the liquid level sensor 137, the PH detection instrument 138, the wireless communication transmission unit 139, the UV sterilizing lamp 140, and the water quality sensor 141 are electrically connected with the controller 132. A touch display screen 131, a plurality of control buttons 133 and a faucet 130 (e.g., a water valve) are arranged on an exterior portion of the detection box 13. A flow detection instrument 144 is arranged on the faucet 130. An acousto-optic alertor 142 and an infrared detector 143 are arranged on the exterior portion of the detection box 13. The touch display screen 131, the control buttons 133, the flow detection instrument 144, the acousto-optic alertor 142, and the infrared detector 143 are electrically connected with the controller 132.

The present disclosure of the sewage treatment device 1 comprises the compression tank 11 that is cylindrically shaped, the stirring structure 12 communicated with the compression tank 11 by the first intermediate pipe 117, and the detection box 13 communicated with the stirring structure 12 by the second intermediate pipe 135. The filter interlayer 110 (e.g. filter stacked layers in series) is arranged in the interior of the compression tank 11 and the filter interlayer 110 is annular. An end of the driving shaft 120 of the telescopic drive cylinder 115 is connected with the compression body 1151. The outer periphery of the compression body 1151 is contacted with the inner wall of the filter interlayer 110. By extrusions and compression of the compressed body 1151, the sewage is filtered by a plurality of filter plates, and the stirring structure 12 is able to further purify the sewage to improve the treatment efficiency. The sewage treatment device 1 is reasonable in system structure design, low in production cost, and good in use effect. The sewage treatment device is suitable for a wide range of promotion.

Furthermore, a supercharger 112 is arranged in the interior of the compression tank 11, and the supercharger 112 is electrically connected with the controller 132.

Furthermore, a cation resin exchange filter layer 1103, an ozone disinfection filter layer 1102 and a calcium carbonate filter layer 1101 are arranged in the filter interlayer 110. The cation resin exchange filter layer 1103 ranges from 1.5-2.2 cm in thickness. The disinfection filter layer 1102 ranges from 1.3-2.3 cm in thickness. The calcium carbonate filter layer 1101 ranges from 1.3-2.5 cm in thickness.

Furthermore, an electrode purifier 122 electrically connected with the controller 132 is arranged inside the stirring structure 12.

Furthermore, the touch display screen 131 is a capacitive touch display screen.

Compared with the prior art, The present disclosure of the sewage treatment device 1 comprises compression tank 11 that is cylindrically shaped, the stirring structure 12 communicated with the compression tank 11 by the first intermediate pipe 117, and the detection box 13 communicated with the stirring structure 12 by the second intermediate pipe 135. The filter interlayer is arranged in the interior of the compression tank 11 and the filter interlayer is annular. An end of the driving shaft 120 of the telescopic drive cylinder 115 is connected with the compression body 1151. The outer periphery of the compression body 1151 is contacted with the inner wall of the filter interlayer. By extrusions and compression of the compressed body 1151, the sewage is filtered by a plurality of filter plates, and the stirring structure 12 is able to further purify the sewage to improve the treatment efficiency. The sewage treatment device 1 is reasonable in system structure design, low in production cost, and good in use effect. The sewage treatment device is suitable for a wide range of promotion.

The above-described embodiments of the present disclosure are not to be construed as limiting the scope of the present disclosure. Any of the modifications, equivalent replacement, and improvement within the spirit and principle of the present disclosure should fall within the protection scope of the claim.

What is claimed is:

1. A sewage treatment device with high safety and reliability, comprising:
   a compression tank that is cylindrically shaped;
   a stirring structure communicated with the compression tank by a first intermediate pipe; and
   a detection box communicated with the stirring structure by a second intermediate pipe;
   wherein a telescopic driving cylinder is arranged on an upper portion of the compression tank and a conveying pipe is connected to a top surface of the compression tank to deliver external sewage to an interior of the compression tank; a diameter of the conveying pipe ranges from 8-15 cm; a filter interlayer is arranged in the interior of the compression tank and the filter interlayer is annular; an end of a driving shaft of the telescopic drive cylinder is connected with a compression body; an outer periphery of the compression body is contacted with an inner wall of the filter interlayer; the compression body is made of silicone and has a thickness in a range of 7-12 cm;
   wherein the filter interlayer comprises a sponge filter layer, an activated carbon filter layer, and a polyvinyl chloride (PVC) filter layer; the activated carbon filter layer is greater than the sponge filter layer and the PVC filter layer in thickness; the activated carbon filter layer ranges from 3-5 cm in thickness; the sponge filter layer, the activated carbon filter layer, and the PVC filter layer, defining a plurality of filter holes; the filter holes are configured to filter sewage; the filter holes of the sponge filter layer, the filter holes of the activated carbon filter layer, and the filter holes of the PVC filter layer are gradually reduced in aperture; each of the filter holes of the sponge filter layer ranges from 0.3-0.6 mm in aperture; an end of the first intermediate pipe extends into a portion arranged between an interior portion of the compression tank and the filter interlayer; sewage compressed by the compression body is filtered from an interior portion of the compression tank by the filter interlayer to the portion arranged between an interior portion of the compression tank and the filter interlayer, and then transported to the stirring structure by the first intermediate pipe; a rotating shaft and a plurality of filter plates connected with the rotating shaft are arranged inside the stirring structure;

wherein a plurality of filter plates comprise a quartz sand filter plate, a cobble filter plate, an anthracite filter plate, an activated carbon filter plate, and a fiber filter plate; the quartz sand filter plate, the cobble filter plate, the anthracite filter plate, the activated carbon filter plate, and the fiber filter plate are sequentially reduced in thickness; the quartz sand filter plate ranges from 7.1-6.9 cm in thickness; the cobble filter plate ranges from 5.8-6.7 cm in thickness; the anthracite filter plate ranges from 4.9-5.5 cm in thickness; the activated carbon filter plate ranges from 4.3-4.8 cm in thickness; the fiber filter plate ranges from 3.3-4.2 cm;

wherein the sewage treatment device further comprises a driving motor configured to drive the rotating shaft to rotate; a cross support frame is arranged on an upper portion of the stirring structure; the driving motor is directly mounted on an upper portion of the cross support frame;

wherein a controller, a doser, a heater, a liquid level sensor, a RH detection instrument, a wireless communication transmission unit, an ultraviolet (UV) sterilizing lamp, and a water quality sensor are arranged inside the detection box; the doser, the heater the liquid level sensor, the PH detection instrument, the wireless communication transmission unit, the UV sterilizing lamp, and the water quality sensor are electrically connected with the controller; a touch display screen, a plurality of control buttons, and a faucet are arranged on an exterior portion of the detection box; a flow detection instrument is arranged on the faucet; an acousto-optic alertor and an infrared detector are arranged on the exterior portion of the detection box; the touch display screen, the control buttons, the flow detection instrument, the acousto-optic alertor, and the infrared detector are electrically connected with the controller.

2. The sewage treatment device according to claim 1, wherein a supercharger is arranged in the interior of the compression tank, and the supercharger is electrically connected with the controller.

3. The sewage treatment device according to claim 1, wherein a cation resin exchange filter layer, an ozone disinfection filter layer, and a calcium carbonate filter layer are arranged in the filter interlayer; the cation resin exchange filter layer ranges from 1.5-2.2 cm in thickness; the ozone disinfection filter layer ranges from 1.3-2.3 cm in thickness; the calcium carbonate filter layer ranges from 1.3-2.5 cm in thickness.

4. The sewage treatment device according to claim 1, wherein an electrode purifier electrically connected with the controller is arranged inside the stirring structure.

5. The sewage treatment device according to claim 1, wherein the touch display screen is a capacitive touch display screen.

* * * * *